United States Patent [19]

Aonuma et al.

[11] Patent Number: 4,634,173
[45] Date of Patent: Jan. 6, 1987

[54] AUTOMOBILE REAR UPPER STRUCTURE

[75] Inventors: Takahiro Aonuma; Minoru Konishi, both of Hiroshima, Japan

[73] Assignee: Mazda Motor Corporation, Hiroshima, Japan

[21] Appl. No.: 754,724

[22] Filed: Jul. 15, 1985

[30] Foreign Application Priority Data

Jul. 16, 1984 [JP] Japan ................................ 59-107479

[51] Int. Cl.⁴ ............................................. B62D 25/00
[52] U.S. Cl. ..................................... 296/188; 296/30; 296/195
[58] Field of Search ............... 296/188, 195, 194, 202, 296/201, 29, 30, 185

[56] References Cited

U.S. PATENT DOCUMENTS

| 4,234,225 | 11/1980 | Harasaki et al. | 296/188 |
| 4,304,434 | 12/1981 | Suzuki et al. | 296/195 |
| 4,348,046 | 9/1982 | Ohya | 296/202 |

FOREIGN PATENT DOCUMENTS

| 58-29571 | 2/1983 | Japan . | |
| 183361 | 10/1983 | Japan | 296/195 |
| 2035920 | 6/1980 | United Kingdom | 296/195 |

Primary Examiner—Robert R. Song
Attorney, Agent, or Firm—Fleit, Jacobson, Cohn & Price

[57] ABSTRACT

An automobile rear upper body structure including a roof panel formed with a longitudinally extending recessed groove along each side edge portion, a rear header extends along the rear edge of the roof panel and connected thereto. The rear header is also connected with a rear pillar inner panel. There is provided a corner reinforcement having one side edge connected with the rear pillar inner panel and the other side edge connected with the rear header. The corner reinforcement is of a convex configuration with the crest portion welded to the recessed groove of the roof panel.

16 Claims, 11 Drawing Figures

AUTOMOBILE REAR UPPER STRUCTURE

BACKGROUND OF THE INVENTION

1. Field of the Invention

The present invention relates to automobile body structures and more particularly to upper body structures for automobiles. More specifically, the present invention pertains to automobile rear upper body structures.

2. Description of Prior Art

In automobile upper body structures, the front or rear corner portion includes a pillar structure extending upwardly from bottom and a windshield header extending transversely and connected at each end with the upper end of the pillar structure. The upper end of the pillar structure is also connected to an end of a roof side rail. Thus, in the upper corner portion, three structures are connected together.

The pillar structure is generally constituted by a pillar inner panel and a pillar outer panel which are welded together along their side edges to form a structure of a closed cross-section. Similarly, the windshield header is welded to the roof panel to form a structure of a closed cross-section. At the junction between the pillar and the windshield header, the pillar inner and outer panels are not welded along one of their edges but the edge of the pillar inner panel is welded to the windshield header and the edge of the pillar outer panel is welded to the roof panel. It will therefore be understood that in the junction the pillar structure has a cross-section which is open at one side so that there is a problem of decrease in rigidity of the body structure.

In order to solve the above problems in the automobile body structure, there is proposed by Japanese utility model disclosure No. 58-29571 to provide a reinforcement at the junction where the pillar structure, the windshield header and the roof side rail are connected together. According to the proposal, the reinforcement is disposed between the pillar inner panel and the pillar outer panel in such a manner that the reinforcement closes an opening which is formed at each end of the windshield header between the windshield header and the roof panel. With this proposal, it is possible to make the closed cross-section of the pillar structure to continue to the closed cross-section of the roof side rail so that the rigidity of the body corner portion can be increased.

The structure as disclosed by the Japanese utility model relates to the front upper body structure but it may be possible to apply the concept of this utility model to the rear upper body structure. It should however be noted that there is a roof structure of a type that is disclosed by the Japanese disclosure No. 58-18873. This type of roof structure is formed with a recessed groove extending along each side of the roof to provide a rain rail and the aforementioned reinforcement structure as taught by the Japanese utility model disclosure No. 58-29571 cannot be applied to the roof structure of this type.

SUMMARY OF THE INVENTION

It is an object of the present invention to provide an automobile rear upper structure in which the corner portions are strengthened.

Another object of the present invention is to provide a reinforcement for an automobile rear upper structure which can be applied to a roof structure of a type having a recessed groove or a rain rail along each side of the roof.

According to the present invention, the above and other objects can be accomplished by an automobile rear upper body structure including a roof structure having a roof panel and a roof side rail formed along each side of said roof panel, said roof side rail including a side rail inner panel and a side rail outer panel which are connected together to form a structure of a close cross-section, said roof structure being formed with a longitudinally extending recessed groove along each side thereof, a rear pillar structure including a pillar inner panel and a pillar outer panel which are welded together to form a structure of a closed cross-section, a rear header extending transversely and having a rear edge connected with a rear edge of the roof panel, said pillar inner panel having an upper portion connected with said rear header and said side rail inner panel, said pillar outer panel having an upper portion connected with said roof panel and said side rail outer panel, a corner reinforcement having one end connected with the pillar inner panel, an intermediate portion connected with a bottom portion of said recessed groove and the other end with said rear header.

According to a preferable aspect of the present invention, the corner reinforcement is of a convex cross-sectional configuration having a top portion which is connected with the bottom portion of the recessed groove. The corner reinforcement may be made as a one-piece construction or may be made of a plurality of pieces which are welded together. Alternatively, the corner reinforcement may at least partly be formed integrally with the rear header or the side rail outer panel.

The above and other objects and features of the present invention will become apparent from the following descriptions of preferred embodiments taking reference to the accompanying drawings.

DESCRIPTION OF THE PREFERRED EMBODIMENTS

Figure 1:
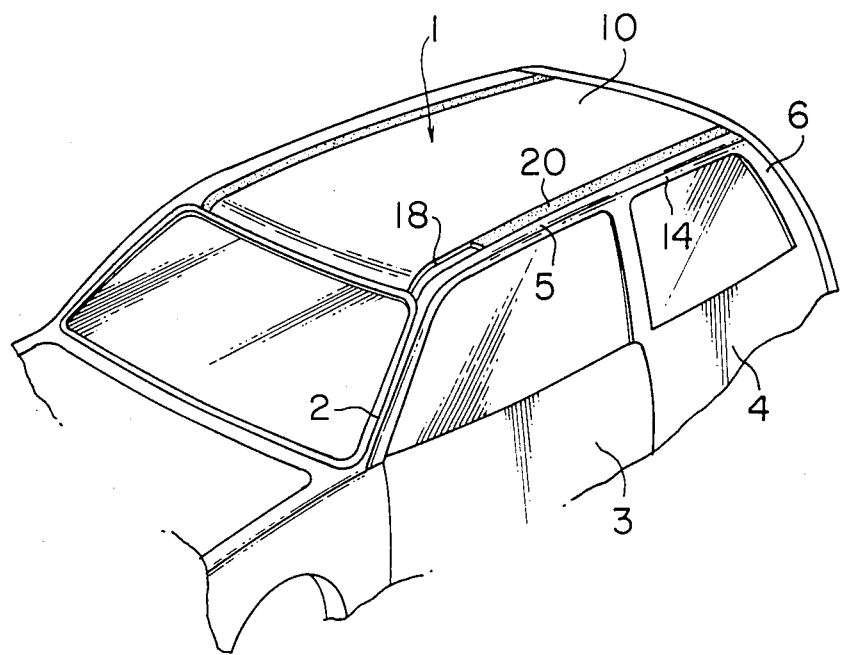
FIG. 1 is a perspective view of an automobile body to which the present invention can be applied.

Referring to the drawings, particularly to FIG. 1, there is shown an automobile body including a roof structure 1, a front pillar 2 extending downwards from each front corner of the roof structure 1, a side door 3 attached to the front pillar 2, and a rear fender 4 provided rearwards the side door 3. At each side of the roof structure 1, there is a side rail 5, and a rain rail 18 is formed longitudinally along the side rail 5. In the rain rail 18, there is a moulding 20. The rear fender 4 is formed at a rear portion with a rear pillar 6 which extends upward and connected with the side rail 5.

Figure 2:
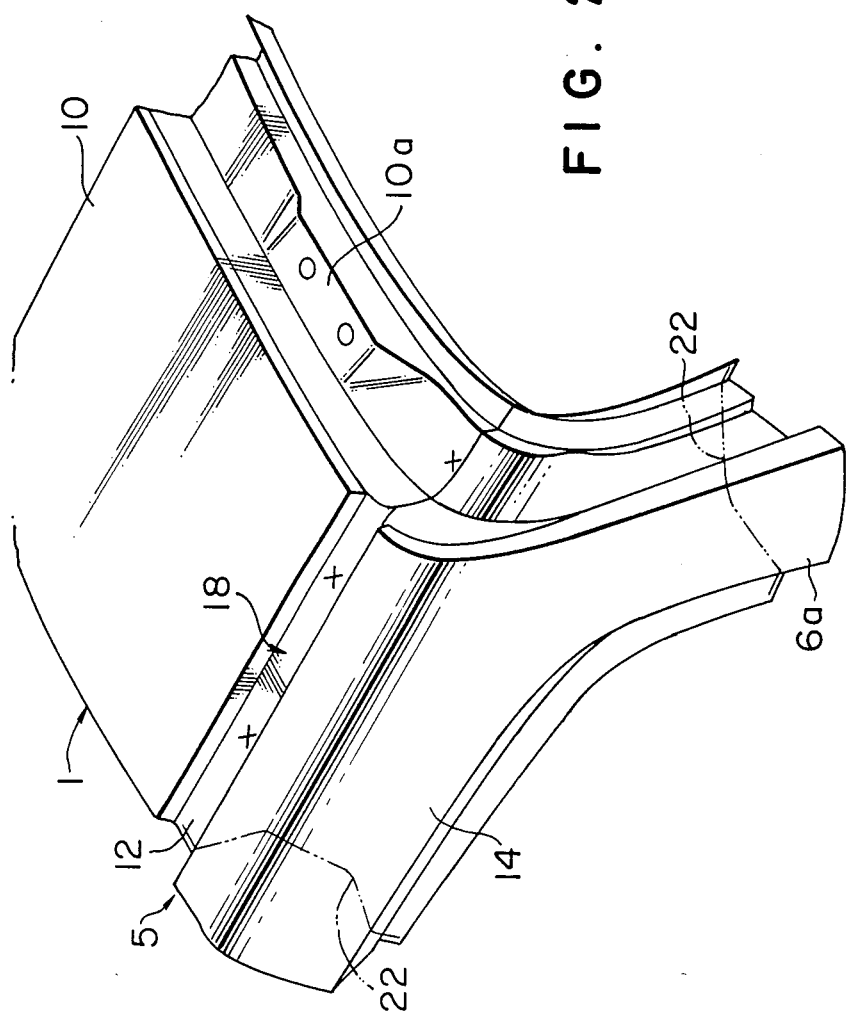
FIG. 2 is a perspective view of a rear upper portion of the automobile body shown in FIG. 1.
Figure 3:
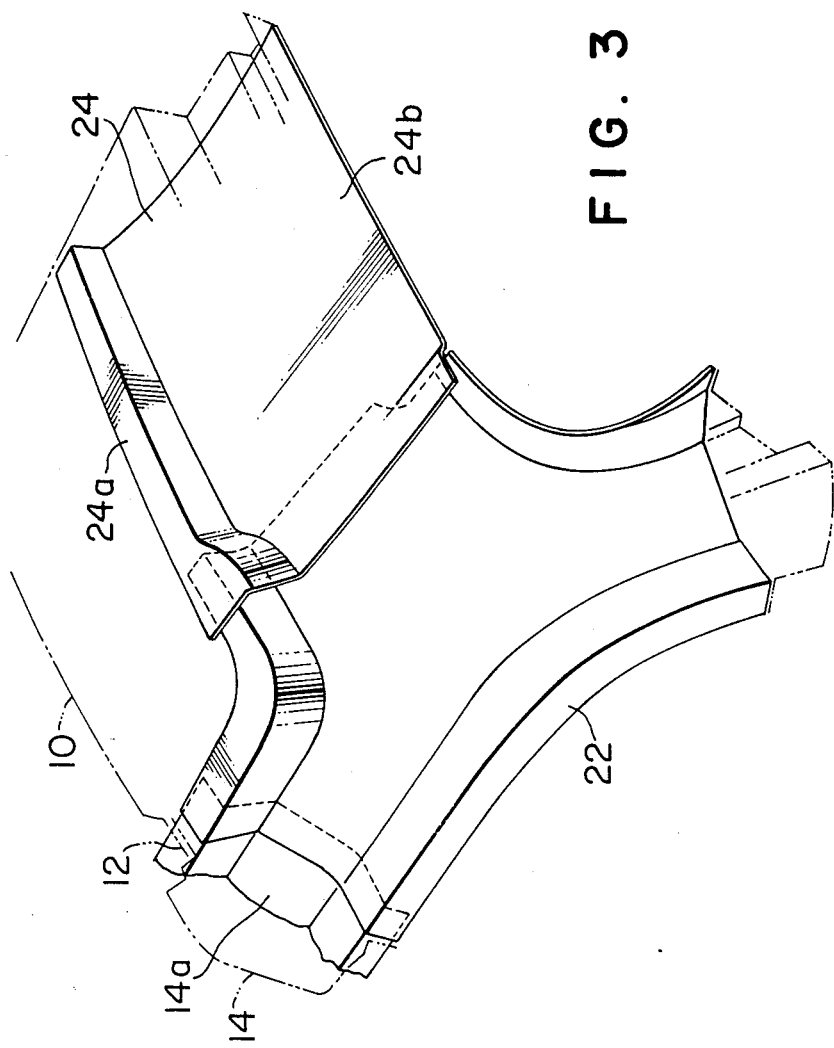
FIG. 3 is a perspective view showing the connections between inside panels in the rear upper structure of the automobile body.
Figure 6:
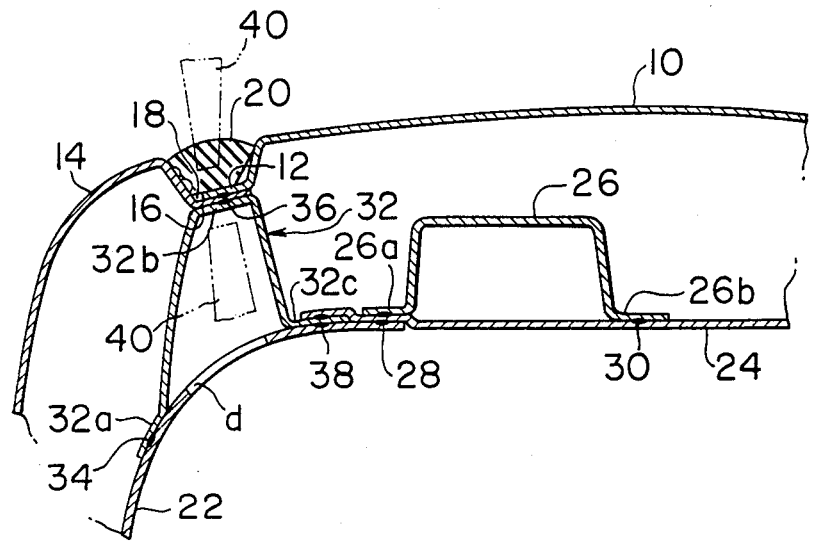
FIG. 6 is a sectional view taken along the line VI—VI in FIG. 5.

Referring to FIG. 2, it will be noted that the roof structure 1 includes a roof panel 10 having a stepped down portion 12 at each side edge to form a part of the rain rail 18. The side rail 5 includes a side rail outer panel 14 which is formed integrally with the rear fender 4 and a side rail inner panel 14a which is shown in FIG. 3. The side rail outer panel 14 and the side rail inner panel 14a are welded together along their side edges to form a structure of closed cross-section. As shown in FIG. 6, the side rail outer panel 14 is formed at the laterally inner side edge with a stepped down portion 16 which is placed beneath the stepped down portion 12 in the roof panel 10 and welded thereto.

Figure 4:
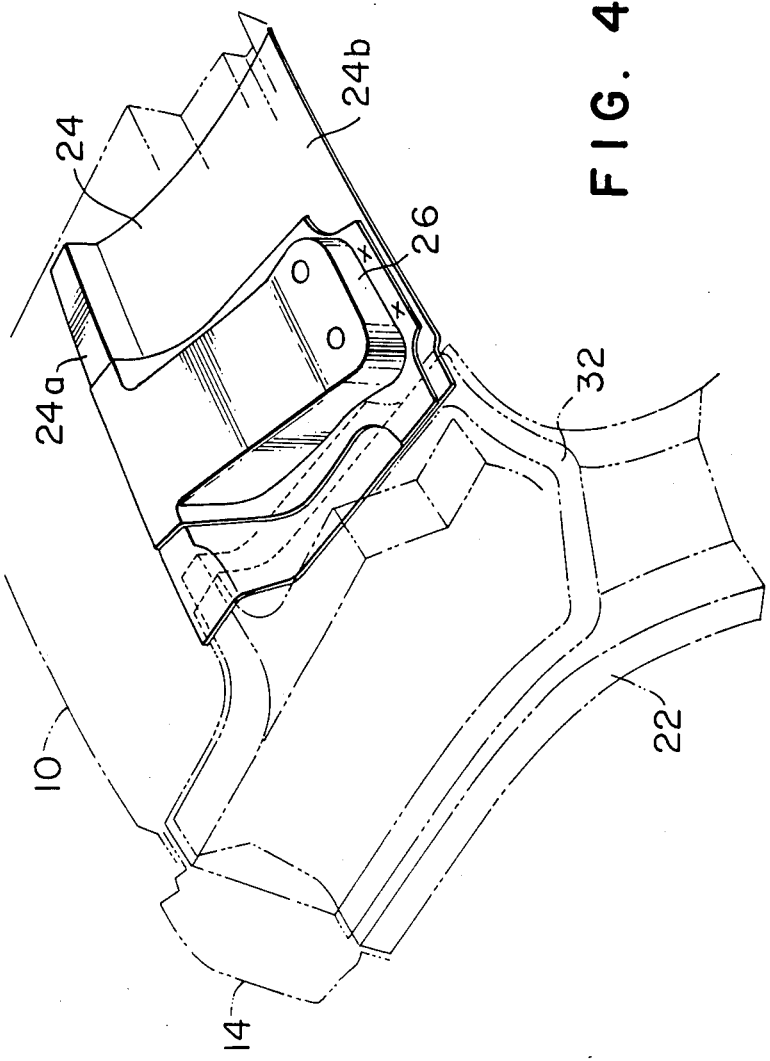
FIG. 4 is a perspective view particularly showing the hinge reinforcement.

The rear pillar 6 is constituted by a rear piller outer panel 6a formed integrally with the rear fender 4 and a rear pillar inner panel 22 which is welded at the opposite side edges to the outer panel 6a to form a structure of closed cross-section. At the rear end of the roof structure 1, there is provided a rear header 24 which extends transversely along the inside of the rear edge portion of the roof panel 10. The rear header 24 has a forward edge 24a welded to the inner surface of the roof panel 10 and a rear edge 24b welded to the rear edge of the roof panel to form a structure of closed cross-section. As shown in FIG. 4, a hinge reinforcement 26 is attached to the rear header 24 to reinforce the hinge mount 10a formed in the rear edge portion of the roof panel 10. In FIG. 2, only one hinge 10a is shown, however, a second hinge mount is provided at the opposite side symmetrically with the hinge mount 10a with respect to the vehicle longiudinal center plane. It will therefore be understood that a second hinge reinforcement is attached to the rear header 24 at the opposite end portion of the rear header 24. The hinge mounts 10a are provided for mounting hinge brackets for a back door (not shown) which is attached to the rear portion of the vehicle body.

In FIG. 2, it will be noted that the rear pillar outer panel 61 is welded at the upper edge to the rear side edge of the roof panel 10. As shown in FIG. 3, the rear pillar inner panel 22 is welded at the upper front edge to the rear edge of the side rail inner panel 14a and at the upper inner edge to the rear header 24. It will be understood in FIG. 3 that the rear pillar inner panel 22 is not welded to the rear pillar outer panel 6a at the upper portion of the rear pillar 6 so that the structure of closed cross-section is discontinued. Thus, the space formed between the roof panel 10 and the rear header 24 is opened at the end of the rear header 24 causing a decrease in the rigidity of the structure.

Figure 5:
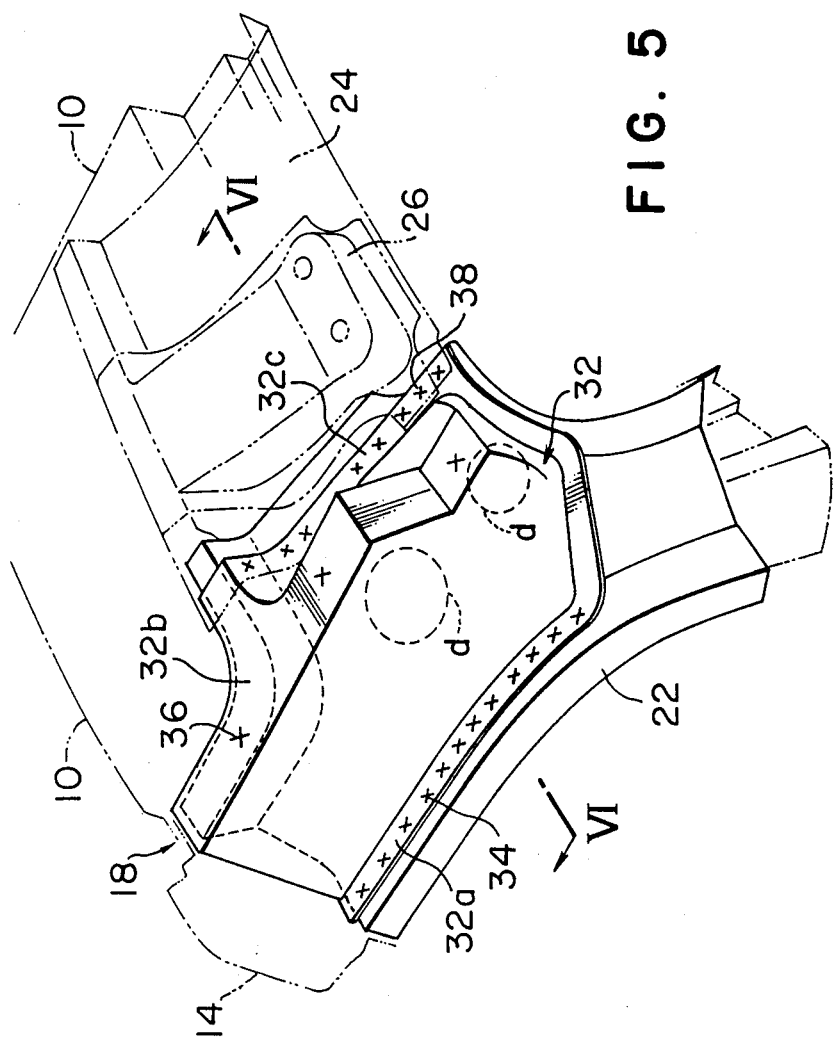
FIG. 5 is a perspective view particularly showing the reinforcement in accordance with one embodiment of the present invention.

In order to prevent the decrease in the rigidity, there is provided a corner reinforcement 32 which has a configuration as shown in FIG. 5. The corner reinforcement 32 has a laterally outer edge 32a attached through spot weldings 34 to the rear pillar inner panel 22. Referring also to FIG. 6, it will be noted that the corner reinforcement 32 is of a convex configuration having a crest 32b which is attached by spot weldings 36 to the stepped down portions 12 and 16. The corner reinforcement 32 further has a laterally inner edge 32c which is connected through spot weldings 38 to the rear pillar inner panel 22 and the rear header 24. In order to make it possible to carry out the spot weldings 38, the rear pillar inner panel 22 is formed with an access hole d through which a welding electrode 40 can be inserted.

It will be understood from the above descriptions that the corner reinforcement 32 is secured to the rear pillar inner panel 22, the rain rail 18 and the rear header 24, it is possible to increase the rigidity and the strength of the rear upper corner portion of the vehicle body. The crest of the convex configuration of the corner reinforcement 32 is arranged along the side edge of the roof panel 10 and welded to the roof panel 10, the side rail outer panel 14 and the rear pillar outer panel 6a. As the result, the connection of the roof panel 10 to the side rail outer panel 14 and to the rear pillar outer panel 6a can effectively be reinforced. It should further be noted that the laterally inner edge 32c of the corner reinforcement 32 functions to reinforce the rear header 24. The convex configuration of the corner reinforcement 32 has a function of reinforcing the side rail structure. As the result, the rear upper corner portion of the body can be reinforced effectively.

Figure 7:
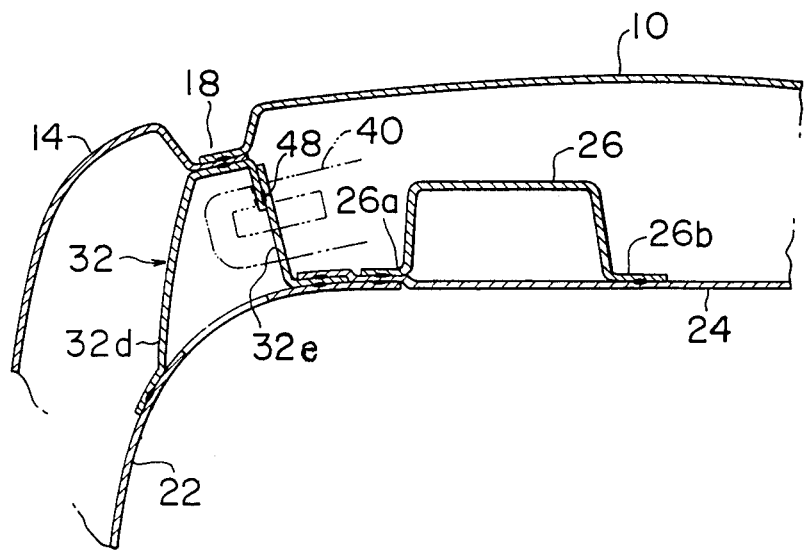
FIGS. 7 through 11 are sectional views similar to FIG. 6 but showing different embodiments.
Figure 8:
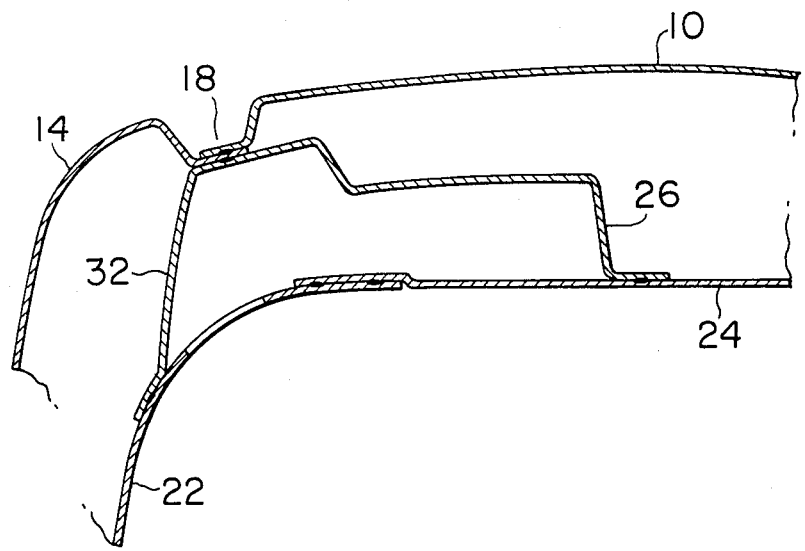
Figure 9:
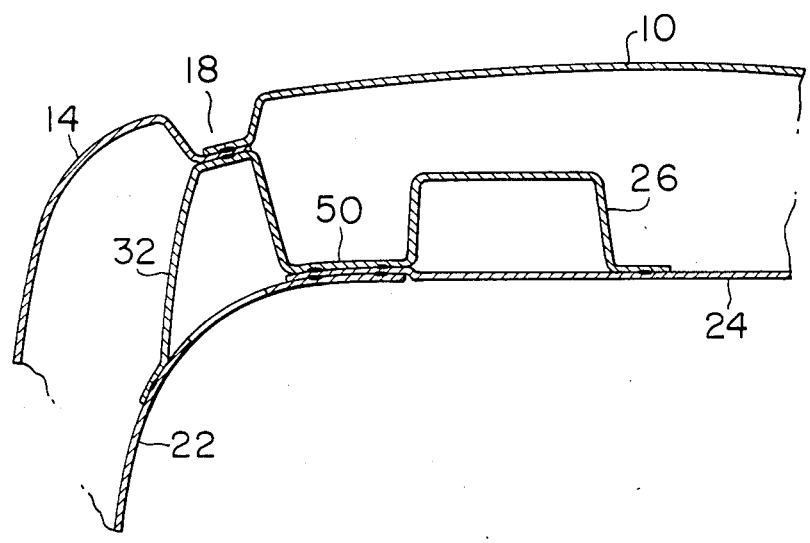
Figure 10:
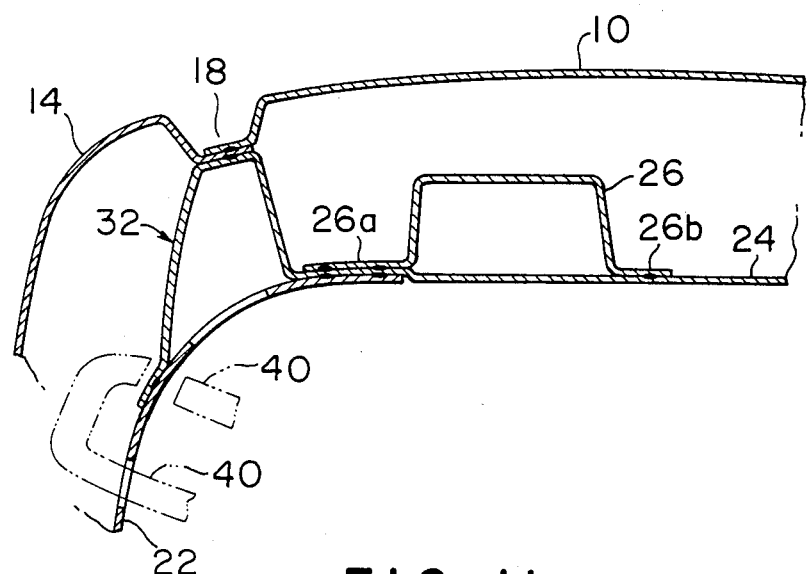
Figure 11:
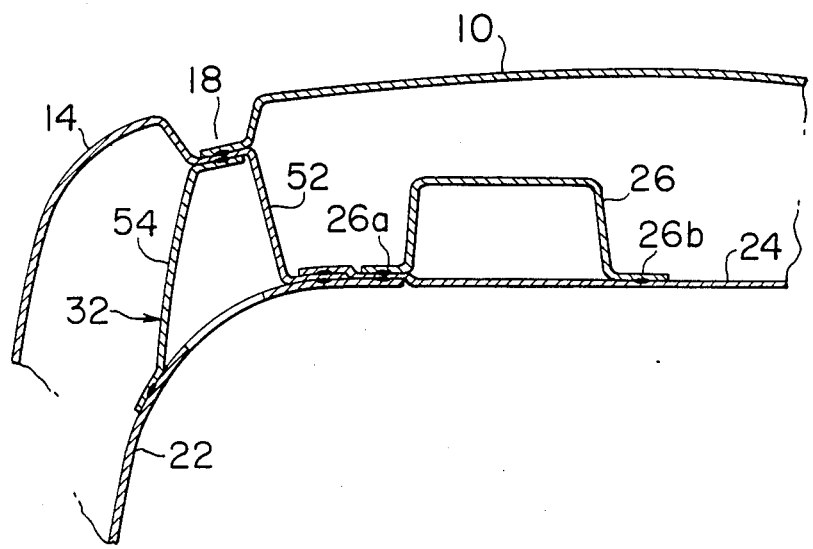

Referring now to FIG. 7, the embodiment shown therein is different from the previous embodiment in that the corner reinforcement 32 is comprised of two pieces 32d and 32e which are connected together by spot weldings 48. In the embodiment shown in FIG. 8, the corner reinforcement 32 is formed integrally with the hinge reinforcement 26. FIG. 9 shows a modification of the structure shown in FIG. 8. The corner reinforcement 32 is formed integrally with the hinge reinforcement 26 and there is formed a recessed portion 50 between the hinge reinforcement 26 and the corner reinforcement 32. The recessed portion 50 is welded to the rear pillar inner panel 22 and the rear header 24. In FIG. 10, the corner reinforcement 32 is formed integrally with the rear header 24. In the embodiment shown in FIG. 11, the side rail outer panel 14 is extended beyond the stepped down portion which forms a part of the rain rail 18. The side rail outer panel 14 is then formed with a downwardly extending wall 52 which is welded at the edge to the rear pillar inner panel 22 and the rear header 24. A reinforcement piece 54 is provided and has one edge welded to the rear pillar inner panel 22 and the other edge welded to the side rail outer panel 14 at the rain rail 18. The wall 52 and the reinforcement piece 54 together form a corner reinforcement 32.

The invention has thus been shown and described with reference to specific embodiments, however, it should be noted that the invention is in no way limited to the details of the illustrated structures but changes and modifications may be made without departing from the scope of the appended claims.

We claim:

1. An automobile rear upper body structure, said body structure comprising:
a roof structure having a roof panel and a roof side rail formed along each side of said roof panel, said roof side rail including a side rail inner panel and a side rail outer panel which are connected together to form a structure of a closed cross-section, said roof structure being formed with a longitudinally extending recessed groove along each side thereof, a rear pillar structure including a pillar inner panel and a pillar outer panel which are welded together to form a structure of a closed cross-section, a rear header extending transversely to said rear pillar and having a rear edge connected with a rear edge of the roof panel, said pillar inner panel having an upper portion connected with said rear header and said side rail inner panel, said pillar outer panel having an upper portion connected with said roof panel and said side rail outer panel, a corner reinforcement having a laterally outer edge connected with said pillar inner panel, an intermediate portion connected with a bottom portion of said recessed groove and a laterally inner edge connected with said rear header.

2. A body structure in accordance with claim 1 in which said corner reinforcement is of a convex cross-sectional configuration having a top portion which is connected with the bottom portion of the recessed groove.

3. A body structure in accordance with claim 1 in which said corner reinforcement is of a one-piece structure.

4. A body structure in accordance with claim 1 in which said corner reinforcement is comprised of a plurality of pieces which are welded together.

5. A body structure in accordance with claim 1 which said corner reinforcement is at least partly integral with at least one of the rear header and the side rail outer panel.

6. An automobile rear upper body structure, said body structure comprising:
a roof structure formed with a longitudinally extending recessed groove along each side edge portion, said roof structure including a roof panel having a rear edge,
inner panel means including a first portion extending along and connected with said rear edge of the roof panel and a second portion continuous with said first portion and providing a rear pillar inner panel for a rear pillar structure, and
a corner reinforcement having opposite side edges connected with said inner panel means and an intermediate portion connected with said roof structure at said recessed groove.

7. A body structure in accordance with claim 1 in which said laterally inner edge of said corner reinforcement is held between and connected to said rear pillar inner panel and said rear header.

8. A body structure in accordance with claim 6 which further includes a hinge reinforcement located transversely inwardly with respect to the corner reinforcement and connected with said inner panel means.

9. A body structure in accordance with claim 8 in which one of said side edges of the corner reinforcement is connected with said hinge reinforcement.

10. A body structure in accordance with claim 8 in which said corner reinforcement is integral with said hinge reinforcement.

11. A body structure in accordance with claim 10 in which a recess is formed between said corner reinforcement and said hinge reinforcement and said recess is connected with said inner panel means.

12. A body structure in accordance with claim 8 in which said first portion of said inner panel means is formed separately from said second portion, said corner reinforcement being integral with said first portion of the inner panel means and held between and connected to the hinge reinforcement and the second portion of the inner panel means.

13. A body structure in accordance with claim 6 in which said intermediate portion of the corner reinforcement has a longitudinally extending substantially flat portion.

14. A body structure in accordance with claim 6 in which said corner reinforcement includes wall means extending longitudinally in a space between said roof panel and said inner panel means.

15. A body structure in accordance with claim 14 in which said wall means includes a first wall and a second wall located transversely inwards with respect to the first wall.

16. A body structure in accordance with claim 15 which includes a side rail extending along each side of the roof panel, said side rail including a side rail outer panel and a side rail inner panel which are connected together, said second wall being integral with said side rail outer panel.

* * * * *